(12) United States Patent
Tokushige et al.

(10) Patent No.: US 9,688,809 B2
(45) Date of Patent: Jun. 27, 2017

(54) METHOD FOR PURIFYING ALIPHATIC POLYESTER AND ALIPHATIC POLYESTER PURIFIED WITH SAID METHOD

(71) Applicant: MUSASHINO CHEMICAL LABORATORY, LTD., Chuo-ku, Tokyo (JP)

(72) Inventors: Yukiko Tokushige, Tokyo (JP); Tsuyoshi Aoki, Tokyo (JP); Koichiro Suzuki, Tokyo (JP); Jun Machida, Kitaibaraki (JP)

(73) Assignee: MUSASHINO CHEMICAL LABORATORY, LTD., Tokyo (JP)

( * ) Notice: Subject to any disclaimer, the term of this patent is extended or adjusted under 35 U.S.C. 154(b) by 0 days.

(21) Appl. No.: 14/785,490

(22) PCT Filed: Apr. 19, 2013

(86) PCT No.: PCT/JP2013/061640
§ 371 (c)(1),
(2) Date: Oct. 19, 2015

(87) PCT Pub. No.: WO2014/171011
PCT Pub. Date: Oct. 23, 2014

(65) Prior Publication Data
US 2016/0083507 A1 Mar. 24, 2016

(51) Int. Cl.
C08G 63/08 (2006.01)
C08G 63/06 (2006.01)
C08G 63/90 (2006.01)
C08L 67/04 (2006.01)

(52) U.S. Cl.
CPC ............. *C08G 63/08* (2013.01); *C08G 63/06* (2013.01); *C08G 63/90* (2013.01); C08L 67/04 (2013.01)

(58) Field of Classification Search
CPC ....... G03G 9/08755; C08F 2/00; C08L 67/04; C08G 63/08; C08G 63/06; C08G 63/78
See application file for complete search history.

(56) References Cited

U.S. PATENT DOCUMENTS

| | | | |
|---|---|---|---|
| 5,053,485 A * | 10/1991 | Nieuwenhuis | A61L 17/12 528/354 |
| 5,319,038 A | 6/1994 | Tunc | |
| 6,417,266 B1 | 7/2002 | Terado et al. | |
| 6,528,617 B1 | 3/2003 | Terado et al. | |
| 2005/0075464 A1 | 4/2005 | Watanabe | |
| 2006/0047103 A1 | 3/2006 | Armentrout et al. | |
| 2007/0014848 A1 | 1/2007 | Buchholz et al. | |
| 2007/0244293 A1* | 10/2007 | Sato | C08G 63/80 528/272 |
| 2013/0211037 A1 | 8/2013 | Maeda et al. | |

FOREIGN PATENT DOCUMENTS

| | | |
|---|---|---|
| CN | 1327460 A | 12/2001 |
| CN | 1615327 A | 5/2005 |
| CN | 10222945 A | 7/2008 |
| CN | 102219889 A | 10/2011 |
| EP | 1153954 * | 11/2001 |
| EP | 1153954 A1 | 11/2001 |
| EP | 1736498 A1 | 12/2006 |
| JP | H10251394 A | 9/1998 |
| JP | 3273821 B2 | 4/2002 |
| JP | 3286061 B2 | 5/2002 |
| JP | 2004277732 A | 10/2004 |
| JP | 3731298 B2 | 1/2006 |
| JP | 2007056138 A | 3/2007 |
| JP | 2008511730 A | 4/2008 |
| JP | 4651802 B2 | 3/2011 |
| JP | 2012092310 A | 5/2012 |
| WO | 2005090438 A1 | 9/2005 |

OTHER PUBLICATIONS

International Preliminary Report on Patentability corresponding to Application No. PCT/JP2013/061640; Date of Mailing: Jul. 8, 2015.
International Search Report corresponding to Application No. PCT/JP2013/061640; Date of Mailing: Jul. 13, 2013, with English translation.
Written Opinion of the International Searching Authority corresponding to Application No. PCT/JP2013/061640; Date of Mailing: Jul. 16, 2013.
Japanese Notice of Grounds for Rejection corresponding to Application No. 2015-512269; Date of mailing: Aug. 23, 2016, with English translation.
Korean Office Action corresponding to Application No. 10-2015-7033009; Date of Mailing: Aug. 8, 2016, with English translation.
Chinese First Office Action corresponding to Application No. 201380075702.X; Issue Date: May 5, 2016, with English Translation.
Extended European search report corresponding to Application No. 13882601.1-1301/2987815 PCT/JP2013/061640; Date of Mailing: Nov. 18, 2016.

(Continued)

*Primary Examiner* — Gregory Listvoyb
(74) *Attorney, Agent, or Firm* — Cantor Colburn LLP

(57) ABSTRACT

Provided is a method for purifying an aliphatic polyester which reduces coloring of the aliphatic polyester, reduces the amount of residual monomer and residual catalyst, and improves stability and appearance. This method for purifying an aliphatic polyester subjects an aliphatic polyester containing a monomer to heat treatment under dry air containing oxygen at a temperature at or above the melting point of the monomer and at or below the melting point of the aliphatic polyester.

5 Claims, No Drawings

(56) References Cited

OTHER PUBLICATIONS

Japanese Decision of Rejection corresponding to Application No. 2015/512269; Date of Mailing: Dec. 6, 2016, with English Translation.

Chinese Second Office Action corresponding to Application No. 201380075702.X; Issue Date: Dec. 26, 2016, with English translation.

* cited by examiner

METHOD FOR PURIFYING ALIPHATIC POLYESTER AND ALIPHATIC POLYESTER PURIFIED WITH SAID METHOD

This is the U.S. national stage of application No. PCT/JP2013/061640, filed on Apr. 19, 2013, the disclosure of which is incorporated herein by reference.

TECHNICAL FIELD

The present invention relates to a method for purifying an aliphatic polyester and to an aliphatic polyester purified with the method.

BACKGROUND ART

In recent years, there have been concerns over depletion of petroleum resources, and problems of waste disposal and the like from the viewpoint of natural environmental preservation and the like. In particular, molded articles and processed articles of common general-purpose polymer materials, when landfilled as wastes, may remain semi-permanently as foreign matters because of their low microbial degradability and disintegratability. Additionally, there have been problems, such as possibility of elution of additives, such as a plasticizer, which are added in order to extend the process stability and product life of polymers, to contaminate the environment and the like. Also, in the case of incineration as wastes, the high combustion heat quantity, which may damage furnaces, and flue gas and exhaust gas generated by combustion, which may cause environmental contamination, are perceived as problems.

Against these backgrounds, biodegradable polymers that are degradable in the natural environment and their molded articles are required, and studies have been actively conducted on naturally degradable resins such as aliphatic polyesters. Of aliphatic polyesters, in particular, lactic acid-based polymers have a sufficiently high melting point of, for example, 170 to 180° C. and also excel in transparency. Thus, lactic acid-based polymers are greatly promising as packaging materials and molded articles and the like for which their transparency is exploited, and some of the materials and articles have been commercialized. Also, lactic acid-based polymers have an easily hydrolyzable characteristic in the presence of water while being robust. Even if such polymers are discarded in the environment, their influence on the environment is reduced as compared with that of conventional general-purpose resins. Also, in the case of indwelling as a medical material in the living body, lactic acid-based polymers have biodegradability and bioabsorbability, provide low-toxic degradation products, and are friendly to the living body because of their biodegradability and bioabsorbability in the living body. Having such excellent properties, lactic acid-based polymers are promising as drug delivery systems (DDS) and medical materials such as bone fixing materials and stents, some of which have been commercialized.

An aliphatic polyester is obtained, for example, by ring-opening polymerization of an aliphatic cyclic ester in the presence of a polymerization initiator and a catalyst (see, for example, Patent Document 1). A lactic acid-based polymer is obtained by a method such as a method for ring-opening polymerizing a lactide, which is a cyclic ester, singly or in combination with another monomer having biodegradability at a temperature at or above the melting point of the polymer, and a method for condensation-polymerizing lactic acid, which is a hydroxycarboxylic acid, singly or in combination with another monomer having biodegradability. Additionally, a method combined with solid-phase polymerization and the like are known.

Generally, in molding processing of a lactic acid-based polymer, since the polymer is heated at or above the melting point of the polymer, it is known that hydrolysis, depolymerization, and cyclic oligomerization as well as intermolecular and intramolecular transesterification and the like may occur depending on the purification degree of the polymer or the like. In particular, when the polymer before molding processing is insufficiently dried, the polymer may hydrolyze in processing, and the resulting molded article may not be able to achieve sufficient physical properties. Furthermore, the polymerization catalyst remaining in the lactic acid-based polymer serves as a depolymerization catalyst to degrade the polymer into monomers, and thus may reduce the molding processability and degrade the physical properties of the molded article.

Moreover, in molding processing of a lactic acid-based polymer, if a large amount of remaining catalyst and residual monomer exists, coloring during the molding processing may be significantly facilitated to markedly impair the appearance of the resulting molded article, and additionally, the stability such as heat stability may be reduced. Usually, to reduce such influences, means are taken to add additives such as a heat stabilizer, a processing stabilizer, an antioxidant, and a catalyst quencher to the polymer, or demonomerization, catalyst removal or the like is performed in the final step of polymer production. Meanwhile, in application of lactic acid-based polymers in the medical field, such additives currently cannot be added, from the viewpoint of their low toxicity and the like. Accordingly, since measures are taken to increase the molecular weight of the material lactic acid-based polymer and the like in consideration of a decrease in the molecular weight during molding processing, the molding processability may conversely be deteriorated or variation in the quality and coloring may be caused. In particular, bone fixing devices and the like, which are desired to have high strength and maintain the strength for a predetermined period by controlling the hydrolysis rate, require a molecular weight higher than that desired for general purposes. Thus, currently, lactic acid-based polymers as a raw material are purified via complex processes comprising washing with a solvent and the like to improve heat stability and reduce coloring.

In view of the current situations described above, methods are studied for purifying a lactic acid-based polymer to improve the stability such as heat stability. For example, in Patent Document 2, a technique is described for mixing a lactic acid-based polymer, after treatment with hydrogen chloride gas in an organic solvent, with a precipitant to allow the polymer to deposit. In accordance with this method, the catalyst in the polymer can be converted into the form of chloride followed by being removed to improve the stability. However, enormous efforts and costs are required because a solvent is necessary, and specialized equipment is also necessary for handling hydrogen chloride. Moreover, no coloring of the polymer is mentioned in any way, and the hue of the resulting polymer and the like are unknown.

In Patent Document 3, a method for purifying and stabilizing solid particles of a high-molecular-weight polylactide is described, wherein the particles are brought into contact with methanol followed by acetone to extract unreacted monomers and residual catalyst. However, in Patent Document 3, since a solvent is required, enormous efforts and costs become necessary. In addition, although removal of the residual catalyst is mentioned, the coloring of the resulting polymer is not mentioned in any way, and the stability is unknown.

In Patent Document 4, a method for reducing coloring of a lactic acid-based polymer is described, wherein the polymer is subjected to heat treatment at a temperature at or above 120° C. and at or below the melting point under UV-irradiation in a nitrogen atmosphere or in the atmosphere, preferably in a nitrogen atmosphere. However, in Patent Document 4, although a coloring reduction effect is observed, no mention is made of residual catalyst. Moreover, this method, which requires an ultraviolet generator and also requires devising for effective irradiation of ultraviolet light, is applied to limited areas.

In Patent Document 5, a technique for obtaining an aliphatic polyester having excellent stability is described, wherein the polylactic acid obtained by a solid-phase polymerization method by using a volatile catalyst is subjected to heat treatment under gas circulation at a temperature at or above the reaction temperature of the solid-phase polymerization and below 170° C. In accordance with this method, it seems that the stability in forming and the storage stability of the aliphatic polyester are achieved by volatilizing or inactivating the catalyst comprising an organic sulfonic acid, but an applicable polymer requires use of a volatile catalyst, and is limited to those obtained by solid-phase polymerization. Furthermore, there is no mention of coloring.

As described above, conventional techniques related to purification of aliphatic polyesters such as lactic acid-based polymers focus on removal of the residual catalyst for the purpose of improving stability. No method is found for simultaneously reducing the coloring, residual monomer, and residual catalyst with simple equipment in an easy process. Moreover, use of a solvent and a specialized catalyst, or an ultraviolet generator requires a large amount of energy and is economically disadvantageous. Alternatively, in Patent Document 1, demonomerizing the resulting polymer is described, but no mention is made of coloring of the polymer, and the hue and the like of the resulting polymer are not known.

CITATION LIST

Patent Literature

Patent Document 1: JP 2007-056138 A
Patent Document 2: JP 3273821 B
Patent Document 3: JP 3286061 B
Patent Document 4: JP 3731298 B
Patent Document 5: JP 4651802 B

SUMMARY OF INVENTION

Technical Problem

An object of the present invention is to provide a method for purifying an aliphatic polyester which reduces coloring of the aliphatic polyester, reduces the amount of residual monomer and residual catalyst, and improves stability and appearance. Additionally, an object of the present invention is to provide an aliphatic polyester having improved stability obtained by this purification method.

Solution to Problem

The present invention provides a method for purifying an aliphatic polyester, wherein an aliphatic polyester containing a monomer (an aliphatic polyester coexistent with a monomer) is subjected to heat treatment under oxygen-containing dry gas at a temperature at or above the melting point of the monomer and at or below the melting point of the aliphatic polyester.

Also, the present invention provides a method for purifying an aliphatic polyester, wherein an aliphatic polyester is obtained either by adding a monomer such that the content of the monomer reaches not more than 30% by mass to a polymerized product obtained by allowing polymerization reaction to proceed until an equilibrium state is achieved between the monomer and the polymer, or by stopping the reaction when the conversion rate from the monomer to the polymer reaches not less than 70% in the polymerization reaction, the polymerized product being subjected to heat treatment under oxygen-containing dry gas and at a temperature at or above the melting point of the monomer and at or below the melting point of the aliphatic polyester.

Also, in the method for purifying the aliphatic polyester, the oxygen-containing dry gas preferably has an atmospheric pressure dew point temperature of −5° C. or below.

Also, in the method for purifying an aliphatic polyester, the aliphatic polyester is preferably a lactic acid-based polymer.

Also, the present invention provides an aliphatic polyester purified by the method for purifying an aliphatic polyester.

Advantageous Effects of Invention

In the present invention, an aliphatic polyester containing a monomer can be subjected to heat treatment under oxygen-containing dry gas and at a temperature at or above the melting point of the monomer and at or below the melting point of the aliphatic polyester to thereby reduce the coloring of the aliphatic polyester, reduce the amount of residual monomer and residual catalyst, and improve stability and appearance. Also in the present invention, an aliphatic polyester obtained either by adding a monomer to a polymerized product obtained by allowing polymerization reaction to proceed until an equilibrium state is achieved between the monomer and the polymer, or by stopping the reaction when the conversion rate from the monomer to the polymer reaches not less than 70% is subjected to heat treatment under oxygen-containing dry gas and at a temperature at or above the melting point of the monomer and at or below the melting point of the aliphatic polyester, to thereby reduce coloring of the aliphatic polyester, reduce the amount of residual monomer and residual catalyst, and improve the stability and appearance. In accordance with these purifying methods, an aliphatic polyester, such as a lactic acid-based polymer, having improved stability is obtained.

DESCRIPTION OF EMBODIMENTS

Embodiments of the present invention will be described hereinbelow. The present embodiment is an example to implement the present invention, which is not intended to be limited by the present embodiment.

As a result of extensive studies, the present inventors have found that an aliphatic polyester containing a monomer can be subjected to heat treatment under oxygen-containing dry gas at a temperature at or above the melting point of the monomer and at or below the melting point of the aliphatic polyester to reduce the coloring of the aliphatic polyester, reduce the amount of residual monomer and residual catalyst, and improve stability and appearance.

The method for purifying an aliphatic polyester according to the embodiment of the present invention can reduce the coloring caused, for example, during the manufacturing process or derived from the raw materials, reduce the amount of residual monomer and residual catalyst, and improve stability of a product such as heat stability, as well as appearance such as the hue. The method for purifying an aliphatic polyester according to the present embodiment is a simple method and can be applied on an industrial scale.

By purifying by the method for purifying an aliphatic polyester according to the present embodiment, an aliphatic polyester having improved stability can be obtained. In particular, an aliphatic polyester having improved stability for medical applications in which no addition of a heat stabilizer and the like is desired can be obtained.

An aliphatic polyester resin is an aliphatic polyester resin synthesized by polymerization of a polyvalent carboxylic acid such as a dicarboxylic acid with a polyhydric alcohol such as a dialcohol. Examples of the aliphatic polyester resin include lactic acid-based polymers, polycaprolactone, polydioxanone, polyhydroxybutyrate, and polyglycolic acid. The method for purifying an aliphatic polyester according to the present embodiment is particularly suitably applied to lactic acid-based polymers among these, from the viewpoints that lactic acid-based polymers can be treated at a higher temperature because of their high glass transition temperature and high melting point, that the polymers have a small-volume shrinkage after heat treatment, and that the polymers can be employed in articles ranging from solid articles in the form of pellets to molded articles. The aliphatic polyester resin may also be a mixture, whose polymeric composition is not limited in any way.

The weight average molecular weight of the aliphatic polyester resin and lactic acid-based polymer is generally on the order of 5000 to 1000000, preferably 10000 to 500000, more preferably 50000 to 300000, depending on the desirable required physical properties and applications.

Lactic acid-based polymers include lactic acid copolymers and blend polymers, in addition to lactic acid homopolymers. These polymers may also be a mixture, whose polymeric composition is not limited in any way.

A lactic acid homopolymer is formed by polymerizing a lactic acid monomer or lactide. A lactic acid copolymer is formed by copolymerizing a lactic acid monomer or lactide with another copolymerizable component. A lactic acid monomer herein is L-lactic acid, D-lactic acid, or DL-lactic acid, which is formed by mixing L-lactic acid and D-lactic acid in equal amounts. Lactide is L-lactide, D-lactide, meso-lactide, which is a cyclic ester formed by dehydration from L-lactic acid and D-lactic acid, or DL-lactide formed by mixing L-lactide and D-lactide in equal amounts. The component molar ratio of L-lactic acid units to D-lactic acid units L/D in the lactic acid homopolymer or lactic acid copolymer may be any from 100/0 to 0/100. Additionally, there are included stereo-complexes obtained by blending or block-copolymering an L-lactic acid unit-rich lactic acid-based polymer and a D-lactic acid unit-rich lactic acid-based polymer. Furthermore, the lactic acid-based polymer may be crystalline or amorphous. Generally, to allow a lactic acid-based polymer to have crystallinity in the case of a lactic acid homopolymer, the content of either of the L-lactic acid unit and the D-lactic acid unit is 75 mol % or more. To achieve a higher melting point, the content of either of the L-lactic acid unit and D-lactic acid unit is preferably 90 mol % or more.

Examples of other copolymerizable components include polyvalent carboxylic acids such as dicarboxylic acids having not less than two ester bond-forming functional groups, polyhydric alcohols such as dialcohols, hydroxycarboxylic acids, lactones, and various polyesters, various polyethers, and various polycarbonates composed of these various components.

Preferred examples of the polyvalent carboxylic acid include dicarboxylic acids such as succinic acid, adipic acid, azelaic acid, sebacic acid, telephthalic acid, abd isophthalic acid.

Preferred examples of the polyhydric alcohol include aliphatic polyhydric alcohols such as ethylene glycol, propylene glycol, butane diol, pentane diol, hexane diol, octane diol, glycerol, sorbitan, trimethylolpropane, neopentyl glycol, diethylene glycol, triethylene glycol, polyethylene glycol, and polypropylene glycol, and aromatic polyhydric alcohols formed by allowing addition of ethylene oxide to bisphenol.

Examples of the hydroxycarboxylic acid include glycolic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2 hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2-pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy-4-methylpentanoic acid, 4 hydroxy-4-methylhexanoic acid, 4-hydroxy-4-ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, and 8-hydroxyoctanoic acid. Additionally, although some of such hydroxycarboxylic acids may have an asymmetric carbon atom and each may take the D form, L form, or DL form, the forms are not limited in any way.

Preferred examples of the lactone include glycolide, ε-caprolactone glycolide, ε-caprolactone, β-propiolactone, δ-butyrolactone, β-butyrolactone, γ-butyrolactone, pivalolactone, and δ-valerolactone.

No particular limitation is imposed on the catalyst used in the polymerization reaction for obtaining an aliphatic polyester resin, and known catalysts for polymerization can be used. Examples include tin-based compounds such as tin lactate, tin tartrate, tin dicaprylate, tin dilaurate, tin dipalmitate, tin distearate, tin dioleate, tin α-naphthoate, tin β-naphthoate, tin octoate, powder tin, and tin oxide; zinc-based compounds such as zinc powder, zinc halides, and zinc oxide; titanium-based compounds such as tetrapropyl titanate; zirconium-based compounds such as zirconium isopropoxide; antimony-based compounds such as antimony trioxide; bismuth-based compounds such as bismuth oxide (III); and aluminum-based compounds such as aluminum oxide and aluminum isopropoxide.

Of these, catalysts composed of tin or a tin compound are particularly preferred in terms of having high activity and a small amount of additive. For example, in the case of performing ring-opening polymerization of lactide, the amount used is of the order of from 0.001 to 1% by weight relative to lactide.

A method for polymerizing an aliphatic polyester resin can usually be performed at a temperature of the order of from 100 to 220° C. in the presence of the catalyst described above, depending on the type of catalyst. Examples of the method for polymerizing a lactic acid-based polymer include a method by ring-opening polymerization using lactide as the main raw material, a method by dehydration condensation using hydroxycarboxylic acids or oligomers thereof as a raw material described in Japanese Patent Laid-Open Publication No. Hei 7-33861, two-step polymerization of melt polymerization and thermal polymerization using lactide as the main raw material as described in Japanese Patent Laid-Open Publication No. Hei 7-247345, and direct dehydrative condensation from a lactic acid monomer as described in Japanese Patent Laid-Open No. Sho 59-96123. Of these, the melt polymerization method among the ring-opening polymerization methods is preferred in terms of being able to adjust the content of the monomer in the polymer described below and the like.

In the aliphatic polyester resin, various additives may be blended as required, such as a plasticizer, an antioxidant, a heat stabilizer, a photostabilizer, an ultraviolet absorber, a pigment, a colorant, various fillers, an antistatic agent, a mold release agent, a fragrance, a slip agent, a flame retardant, a foaming agent, a filler, an antibacterial agent, an antifungal agent, and a nucleating agent conventionally known.

No particular limitation is imposed on a method for blending various additives to an aliphatic polyester resin, and blending can be performed by a method conventionally known. Kneading may be performed by using, for example, a mill roll, a Banbury mixer, a supermixer, a single screw or twin-screw extruder, and the like, and this mixing-kneading may be usually performed at a temperature on the order of 120 to 220° C.

As such, the purification method of the present embodiment is applicable to a wide variety of aliphatic polyester resins. These polymers may be subjected to polymer decomposition, coloring, and the like caused by heat and the like in the manufacturing process, the process for mixing-kneading the polymer composition, and the like. Although the cause of the coloring that occurs in the manufacturing process and the molding processing process of the polymer is unknown, the presumed causes may be inclusion of a coloring component derived from the raw material monomer or the formation of some coloring components containing lactide or a low-molecular component such as other lactic acid dimer by hydrolysis, depolymerization, and the like of the polymer caused by heat from these processes and the like. In particular, moisture and oxygen may be very likely to facilitate the decomposition and coloring of the polymer.

The method for purifying an aliphatic polyester according to the present embodiment can reduce the coloring and simultaneously reduce the amount of residual monomer and residual catalyst by subjecting the polymer to heat treatment under the presence of oxygen-containing dry gas at a temperature at or above the melting point of the monomer and at or below the melting point of the polymer before or after the molding processing in the course of or after manufacturing of the polymer. Particularly, the method is markedly different from conventional methods, in that a gas containing oxygen, which has been considered unsuitable for heat treatment because of facilitating coloring, is dried before use. Although the decoloring mechanism is uncertain, it is conceivable that the coloring can be reduced and stabilization can be achieved because heat treatment under oxygen-containing dry gas allows the coloring component to be decomposed, sublimated, or integrated in the polymer by some type of reaction due to the action of oxygen, and furthermore, the coloring component, the residual catalyst, and the like in the polymer can simultaneously be removed because a perspiration phenomenon caused by heating at or above the melting point of the monomer allows elimination of the monomer from the polymer.

The heat treatment temperature employed in the method for purifying an aliphatic polyester according to the present embodiment may be a temperature at or above the melting point of the monomer and at or below the melting point of the aliphatic polyester. If the heat treatment temperature is less than the melting point of the monomer, the perspiration action is not effectively exerted. When the heat treatment temperature exceeds the melting point of the aliphatic polyester, the rate of coloring becomes faster than that of decoloring, thereby failing to achieve the effect. In the case where the aliphatic polyester is a lactic acid-based polymer, for example, the heat treatment temperature depends on the difference in crystallinity and the like of the lactic acid-based polymers. Generally, the melting point of a lactic acid-based polymer having crystallinity depends on whether the polymer is a homopolymer or a copolymer, and is usually of the order of 175° C. in the case of a lactic acid homopolymer. Additionally, in a stereo complex, the temperature is on the order of 210° C. to 230° C., for example. The upper limit of the heat treatment temperature, which is at or below the melting point of the polymer, may be determined based on the residual amount of monomer and the like, and in the case where polymer pellets are targeted, a temperature of the degree that cohesion between polymers does not occur is preferably used as the upper limit. Also, if the temperature is increased more than required, the rate of coloring may become faster than that of decoloring to make achieving the effect difficult. Thus, the treatment is preferably performed at a temperature higher than the melting point of the monomer by the order of 20 to 40° C. In the case of a lactic acid-based homopolymer that contains L-lactide, D-lactide, or DL-lactide, which contains L- and D-lactides in equal amounts, as a raw material, the heat treatment temperature may be, for example, 90° C. to 170° C., preferably 95° C. to 160° C., more preferably 100° C. to 150° C.

Pellets of any shape, such as spherical, barrel-like, cylindrical, planar, flake-like, and pulverized shapes, may be used, so long as they are manufactured by a conventionally-known method.

The method for purifying an aliphatic polyester according to the present embodiment may be applied to molded articles and processed articles not only before the molding processing in the course of or after manufacturing of the polymer but also after the molding processing. As for the heat treatment temperature in this case, the articles are preferably treated at their heatproof temperature as the upper limit. In the case where automobile applications and lactic acid-based polymers of a highly-heat-resistant grade are targeted, a temperature of the order of 110° C., for example, can be selected if the heatproof temperature is of the order of 120° C.

Although the heat treatment period in the method for purifying an aliphatic polyester according to the present embodiment may be determined based on the heat treatment temperature, the residual amount of monomer, the molecular weight desired, and the like, a higher temperature enables decoloring in a shorter period. The heat treatment period in the temperature range of, for example, 100° C. to 150° C. is preferably from one hour to 30 hours, more preferably from three hours to 20 hours. In the case of heating for more than 20 hours, recoloring may be observed after decoloring, and a decrease in the molecular weight may become marked. In a heat treatment period less than one hour, the effect may become difficult to achieve.

According to the method for purifying an aliphatic polyester according to the present embodiment, since it is conceivable that heat treatment allows a portion of residual monomer contained in the polymer to be removed by perspiration, sublimation, and the like from the polymer, the residual monomer component can be reduced. Additionally, due to the perspiration action of the residual monomer, it is conceivable that the residual catalyst can be removed simultaneously. Stability such as the heat stability of the aliphatic polyester can be improved by these effects. It is conceivable that the higher the amount of residual monomer in the polymer, the more effective the aforementioned perspiration action may be exerted, and the higher decoloring and catalyst reduction effects may become. However, in terms of economic efficiency, an increasing load of the demonomerizing treatment thereafter, and the like, the content of the monomer in the polymer is preferably not more than 30% by mass, more preferably not more than 20% by mass. Alternatively, "containing a monomer" herein means that the content of the monomer in the polymer is not less than 0.2% by mass, preferably not less than 0.3% by mass. If the content of the monomer in the polymer is less than 0.1% by mass, the perspiration action may fail to be effectively exerted.

To allow the content of the monomer in the polymer to be not less than 0.2% by mass, the monomer may be added after the polymer is manufactured, or the residual amount of monomer may be adjusted in manufacturing the polymer. If the aliphatic polyester is manufactured by the solid-phase polymerization method, the residual amount of monomer usually becomes not more than 0.1% by mass. Thus, the solid-phase polymerization method may be not suitable as the method for manufacturing an aliphatic polyester used for the present purification method.

It should be noted that, in case of obtaining a high-molecular weight polymer having a weight average molecular weight of, for example, not less than 200000 by melt polymerization of lactide and the like by using a batch-type reactor and the like, the coloring tends to be increased due to a local increase in the temperature by shear heat generation while stirring becomes difficult in association with an increase in the viscosity. Additionally, transfer to the next process may require enormous energy. In contrast, Japanese Patent No. 2621813, for example, employs a method in which the polymer is removed out of the system before the polymerization reaction reaches an equilibrium; i.e., before the aforementioned problem occurs, and subsequently, polymerization is allowed to proceed by using other device and method. The method for purifying an aliphatic polyester according to the present embodiment can achieve any combination of manufacturing processes, from the viewpoint of being applicable to a polymer that is obtained by adding the monomer in the course of such polymerization or after the polymerization with a purpose of decreasing the viscosity and that contains a large amount of residual monomer.

Particularly, in medical applications and the like in which no addition of additives such as a heat stabilizer and a processing stabilizer is desired, a batch-type reactor is frequently used in view of low volume and high variation. However, in the case of melt polymerization using a batch-type reactor, it is difficult to obtain a highly viscous product (high-molecular-weight polymer) due to reasons such as: (1) a large amount of energy may be required due to an increase in the stirring power; (2) if the temperature is increased when the high-molecular-weight polymer is removed out of the reactor, quality degradation such as coloring due to heat, a decrease in the molecular weight, and the like may occur; and (3) as the polymerization proceeds and the viscosity increases, it may become difficult to perform homogeneous stirring. Then, using an aliphatic polyester, which is obtained by adding the monomer to a polymerized product obtained by allowing the polymerization reaction to an equilibrium state of the monomer and the polymer, as a raw material of the method for purifying an aliphatic polyester according to the present embodiment has an effect of decreasing the viscosity by addition of the monomer, enables removal at a low temperature from the reactor, and particularly, can reduce the influence of the above-described (2). Also, as described above, since it is conceivable that the higher the amount of residual monomer in the polymer, the more effective the aforementioned perspiration action can be exerted, and the higher decoloring and catalyst reduction effects become, the effects can be further exerted.

Alternatively, use of an aliphatic polyester, which is obtained by stopping the reaction when the conversion rate from the monomer to the polymer reaches not less than 70% in the polymerization reaction, as a raw material of the method for purifying an aliphatic polyester according to the present embodiment can suppress the adverse influence due to the increased viscosity of the polymerized product mentioned above, and additionally, can allow the content of the monomer in the polymer as described above to be not more than 30% by mass. This method may eliminate the requirement to allow polymerization to proceed at a different temperature in another reactor after removal of the polymerized product. To obtain a polymer having a desired molecular weight, the amount of a molecular weight adjuster added at the start of polymerization may be adjusted depending on a desired monomer content when the reaction is stopped.

In addition, in the method for purifying an aliphatic polyester according to the present embodiment, heat treatment can be performed under oxygen-containing dry gas.

While usual heat treatment uses an inert gas such as nitrogen and argon, which contains substantially no oxygen, for the purpose of preventing coloring due to heat degradation of the polymer, the present purification method uses oxygen-containing dry gas, because it is conceivable that the oxygen in the oxygen-containing dry gas facilitates decoloring. The mechanism by which oxygen facilitates discoloring is uncertain, but it is conceivable that the coloring component comes in contact with oxygen to be subjected to some type of action and be chemically denatured. It should be noted that an inert gas, such as nitrogen, containing substantially no oxygen exhibits little or no effect in the present purification method. This supports a possibility that oxygen acts as a decoloring agent. It should be noted that the aliphatic polyester treated may be purged with an inert gas such as nitrogen and the like after the heat treatment is finished, for the purpose of preventing recoloring and the like.

Examples of the gas containing oxygen include air, oxygen, nitrogen containing oxygen, argon, and carbon dioxide, with air being preferred from the viewpoints of its easy availability, economic efficiency, and the like. There may be used any oxygen-containing dry gas obtained by conventionally known methods or devices. Specific examples include gases obtained by compressing air with an air compressor and the like, gases obtained by further cooling this compressed air, mixtures of nitrogen and oxygen in an optional proportion, and gases obtained by ozonizing such air. As for the purity of the oxygen-containing dry gas, gas of any purity may be used, except at the dew point temperature of moisture. Herein, the oxygen content of the "gas containing oxygen," which refers to a gas containing not less than 1% by volume of oxygen relative to the total amount of the gas, is preferably not less than 1% by volume and not more than 90% by volume, more preferably not less than 3% by volume and not more than 80% by volume relative to the total amount of the gas. If the oxygen content of the gas containing oxygen is less than 1% by volume, the decoloring effect may fail to be sufficiently achieved. If the content is more than 90% by volume, the possibility of firing or dust explosion during heat treatment may increase.

A "dry gas" herein refers to a gas in which the moisture has an atmospheric pressure dew point temperature of $-5°$ C. or below. A dry gas can be obtained by dehumidifying a gas and the like.

During the heat treatment under oxygen-containing dry gas, the molecular weight may be decreased to a certain extent due to hydrolysis of the polymer and the like. Accordingly, in order to suppress a decrease in the molecular weight during heat treatment as much as possible, particularly in the case of suppressing a decrease in the molecular weight by not more than $-10\%$ of the initial molecular weight, the atmospheric pressure dew point temperature is preferably $-50°$ C. or below, more preferably $-70°$ C. or below.

In the method for purifying an aliphatic polyester according to the present embodiment, no particular limitations are imposed on the flow rate, introduction method, pressure, and the like of the oxygen-containing dry gas. However, when a large amount of the oxygen-containing dry gas is used, the economic efficiency and the like may be degraded, or the molecular weight of the polymer may be further decreased due to the moisture in the oxygen-containing dry gas and the like. In devices that can be used under pressure, the heat treatment may be performed in a sealed state. Alternatively, in the case of performing the heat treatment under the atmospheric pressure, the oxygen-containing dry gas has a sufficient flow rate enough to facilitate removal of the monomer to the outside of the system by evaporation and sublimation and the like to an extent that the perspiration action of the monomer and the like are not prevented. It should be noted that the oxygen-containing dry gas is preferably allowed to flow under reduced pressure at a pressure reduction degree of an extent that the perspiration action of the monomer is not prevented, for example, a pressure reduction degree at or above 13 kPa. As described above, the flow rate and the like of the oxygen-containing dry gas may be that at an appropriate time depending on the treatment conditions and devices and the like.

Additionally, after the treatment according to the present purification method, various known purification methods may be further applied for the purpose of improving the purity of the aliphatic polyester and the like. These purification methods may be performed singly, or may be performed in combination. As an example of the purification method, it is possible to apply a method of washing with a solvent and the like, provided that the article to be decolored is in the form of pellets, as described in Japanese Patent No. 4659451. Additionally, as described in Japanese Patent No. 3419609, for the purpose of further reducing the amount of residual monomer, the residual monomer in a melt state or a solid state can be removed under reduced pressure by evaporation, sublimation, or the like. In general, the conditions may be selected to an extent that the coloring, the amount of the residual monomer, and the like can be reduced to a desired degree for treatment, in consideration of the coloring degree of the polymer composition to be the target of decoloring stabilization, the amount of residual monomer, the amount of residual catalyst, applications of the product, and the like.

The aliphatic polyesters such as a lactic acid-based polymer obtained by the method for purifying an aliphatic polyester according to the present embodiment may have the reduced coloring as well as the reduced amount of residual monomer and residual catalyst. Accordingly, the aliphatic polyesters can be used in various applications, and are suitably used as common plastics in a molding processing method, such as injection molding, extrusion molding, inflation molding, hollow extrusion molding, foam molding, calendar molding, blow molding, balloon molding, vacuum molding, spinning, and the like, for example, at a molding temperature of the order of 150 to 250° C.

Examples of articles obtained by the aforementioned various molding processing methods include, but are not particularly limited to, members of writing goods such as ballpoint pens, mechanical pencils, and pencils, members of stationery, golf tees, members for smoke golf balls for opening ceremonies, capsules for oral medicines, carriers for anal and vaginal suppositories, carriers for skin and mucous plasters, capsules for agrochemicals, capsules for fertilizers, capsules for seeds and seedlings, composts, reels for fishing lines, floats for fishing, artificial flies for fishery, lures, buoys for fishery, decoys for hunting, shotgun bullet capsules for hunting, camping equipment such as tableware, nails, piles, bundling materials, slip stoppers for muddy and snowy roads, blocks, lunch boxes, tableware, containers for lunches and prepared dishes sold in convenience stores, chopsticks, disposable chopsticks, forks, spoons, skewers, tooth picks, cups for instant noodles, cups used in vending machines of drinks, containers and trays for foodstuffs such as fresh fish, dressed meats, fruits and vegetables, soybean curds and prepared dishes, boxes used in fresh fish markets, bottles for milk products such as milk, yogurt, and lactic acid bacteria beverages, bottles for soft drinks such as carbonated drinks and cold drinks, bottles for alcoholic drinks such as beer and whiskey, bottles having or not having a pump for shampoo or liquid soaps, tubes for tooth powder, cosmetic containers, detergent containers, bleach containers, cool boxes, flower pots, casings for water purifier cartridges, casings of artificial livers or artificial kidneys and the like, members of injection syringes, cushioning materials used for transporting home electrical appliances such as televisions and stereos, cushioning materials used for transporting precision instruments such as computers, printers, and clocks, and cushioning materials used for transporting ceramic materials such as glassware and chinaware.

The aliphatic polyesters such as a lactic acid-based polymer obtained by the method for purifying an aliphatic polyester according to the present embodiment, which can be applied to the aforementioned various applications, excel in appearance such as a hue and the like and in stability such as heat resistance even without use of a solvent used for the purpose of reducing the amount of residual catalyst and the like in purifying and without use of additives such as a processing stabilizer and an antioxidant for the purpose of suppressing coloring and the like in molding processing, and thus, can be suitably used for medical applications and the like in which these impurities are not desired to be contained.

EXAMPLES

The present invention will be more specifically described hereinbelow by reference to Examples and Comparative Examples, but the present invention is not intended to be limited to the Examples below.

<Various Measurement Methods>

[Melting Point of the Monomer and the Polymer]

The peak temperatures of the endothermic peaks obtained by using a differential scanning calorimeter under the following measurement conditions were used as the melting points of the monomer and the polymer.

(Measurement Conditions)

Apparatus: DSC-60 (manufactured by SHIMADZU CORPORATION)

The amount of sample measured: 10 mg
Atmosphere: nitrogen flow rate 50 mL/min
Measurement start temperature: 30° C.
Measurement end temperature: 250° C.
Temperature rising rate: 10° C./min

[Weight Average Molecular Weight (Mw)]

The weight average molecular weight was determined under the measurement conditions shown below, as a value in terms of polystyrene by GPC analysis.

(Measurement Conditions)

Apparatus: GPC apparatus Shodex® GPC-104 (manufactured by Showa Denko K.K.)

Measurement column: two Shodex® LF404 (manufactured by Showa Denko K.K.) columns connected in series Object column: two Shodex® KF404 (manufactured by Showa Denko K.K.) columns connected in series Detector: RI (Refractive index detector)
Measurement temperature: 40° C.
Eluant: chloroform (manufactured by JUNSEI CHEMICAL CO., LTD., for high performance liquid chromatograph)

Measurement method: Measurement was conducted by injecting 20 μL of a sample dissolved at a concentration of 5 mg/mL in chloroform of the same grade as the eluant at an eluant flow rate of 0.3 mL/min. Measurement of 10 polystyrene standards having different molecular weights manufactured by TOSOH CORPORATION at a concentration of 0.5 mg/mL was conducted in the same manner to prepare a calibration curve.

[Amount of Residual Monomer]

The residual monomer, lactide component, was measured under the following measurement conditions by gas chromatography analysis.

(Measurement Conditions)

Apparatus: gas chromatograph apparatus GC-14B (manufactured by SHIMADZU CORPORATION)

Detector: FID
Hydrogen pressure: 60 kPa
Air pressure: 50 kPa
Detector temperature: 200° C.
Column oven temperature: 175° C.
Injection temperature: 200° C.
Carrier gas: helium
Carrier gas flow rate: 50 mL/min
Column: a glass column having an inner diameter of 2.6 mm×a length of 1.5 m and filled with a mixture of FAL-M10% Shimalite® TPA 60-80 mesh and Tenax® TA 60-80 mesh at a capacity ratio of 1:1

Recorder: CR-7A plus (manufactured by SHIMADZU CORPORATION)

Determination method: one gram of a polymer sample, to which 0.4 g of triethylene glycol was added as an internal standard substance, was dissolved in 25 mL of chloroform and subjected to measurement at an injection amount of 1 LL.

[Yellow Index (YI)]

1.5 grams of the resulting polymer was dissolved in 10 mL of chloroform, and the resultant was placed in a quartz cell having an optical path of 1 cm, and scanned with a spectrophotometer SHIMADZU UV-2550 (manufactured by SHIMADZU CORPORATION) at a viewing angle of 2° using the light source C in the wavelength range of 780 to 360 nm. XYZ3 stimulus values were calculated with color measurement software and converted into a yellow index YI, the increase and decrease of which were used for evaluation.

[Amount of Residual Catalyst]

The residual catalyst before and after treatment was evaluated using the increase and decrease in the content of the Sn element in accordance with a method shown below.

(Measurement Conditions)

Apparatus: ICP emission spectrometer ICPS-8000 (emission spectrometry SHIMADZU CORPORATION)

Measurement: To 0.5 g of a polymer sample weighed into a quartz beaker, 3 mL of nitric acid, 0.5 mL of perchloric acid, and 0.5 mL sulfuric acid were added and the resultant mixture was heated to decompose the sample. After cooling, pure water was added to make a total volume 20 mL to prepare a measurement solution. Standard solutions having respective Sn contents of 0, 0.2, 0.4, and 1.0 ppm were separately prepared, and the measurement solution was subjected to measurement by the calibration curve method. Values of three repetitive measurements were averaged to obtain a measurement value, which was multiplied by the constant volume and divided by the weight of the polymer sample, with the result represented in ppm.

[Heat Stability]

A 10 mL brown glass ampoule was filled with 3 g of a decolored sample having an outer diameter of 2 to 3 mm or untreated polymer pellets and dried under reduced pressure at 100° C. and 10 mmHg for 2.5 hours. Afterward, nitrogen purge was repeated four times, and the tip of the ampoule was melt-sealed using a gas burner to establish a hermetic state. Subsequently, a heat stability test was performed by leaving the ampoule in an oven at 220° C. for an hour or three hours to evaluate the decrease in the molecular weight before and after treatment. It should be noted that, of the decolored samples, those having an amount of the residual monomer more than 0.5% by mass were heated under reduced pressure at 130° C. to remove the residual monomer and to provide test samples.

[Mw Retention Rate]

A weight average molecular weight before and after heating in the decoloring treatment or heat stability test was substituted in expression 1 described below to provide the Mw retention rate.

[Expression 1]

$$\frac{\left(\begin{array}{c}Mw \text{ after the decoloring treatment or}\\ \text{heat stability test}\end{array}\right)}{\left(\begin{array}{c}Mw \text{ before the decoloring treatment}\\ \text{or heat stability test}\end{array}\right)} \times 100\,(\%) \qquad \text{Expression 1}$$

[YI Reduction Rate]

The reduction in YI in decoloring treatment was substituted in expression 2 described below and evaluated.

[Expression 2]

$$\frac{YI \text{ before the decoloring treatment}) - (YI \text{ after the decoloring treatment})}{(YI \text{ before the decoloring treatment}))} \times 100\,(\%) \qquad \text{Expression 2}$$

[Sn Content Reduction Rate]

The reduction in the Sn content in decoloring treatment was substituted in expression 3 described below and evaluated.

[Expression 3]

$$\frac{(Sn \text{ content before the decoloring treatment}) - (Sn \text{ content after the decoloring treatment})}{(Sn \text{ content before the decoloring treatment})} \times 100\,(\%) \qquad \text{Expression 3}$$

Manufacture Example

Poly-L-lactic acids shown in Table 1 were each produced using a reactor equipped with a double helical ribbon impeller. For each polymer, to 3000 parts by mass of the raw material, L-lactide (manufactured by Musashino Chemical Laboratory, Ltd.), 50 ppm of the catalyst, tin octylate was added, lauryl alcohol as the molecular weight adjuster was added in an amount shown in Table 1, and ring-opening polymerization was performed at a temperature of 190 to 200° C.

It should be noted that, for the raw material 1, before the conversion rate of L-lactide to the polymer reached an equilibrium state, the polymerization reaction was stopped by addition of 200 ppm of sodium polyphosphate as the catalyst quencher to adjust the lactide content, and subsequently, the polymerized product in a melt state was removed out of the reaction system as a strand, and, after water cooling, cut into cylindrical pellets having a length of 3 to 4 mm and an outer diameter of 2 to 3 mm. It should be noted that the lactide content in the polymerized product collected from the reaction system was measured, and, by assuming that all the lactide except that remaining in a polymerized product was converted into the polymer, the conversion rate from L-lactide to the polymer was determined by the following expression to be 88.75%.

$$\text{Conversion rate } (\%) = 100 - L\text{-lactide content } (\%) \qquad \text{Expression 4}$$

The raw material 2 was produced in the same manner as the raw material 1 except that, after the polymerization reaction was performed until an equilibrium state was achieved, 150 parts by mass of L-lactide was added to adjust the lactide content. It should be noted that the polymerized product was collected from the reaction system every hour to measure the content of L-lactide and that the "equilibrium state" of the polymerization reaction was determined to have been achieved when the content of L-lactide showed no change. The raw material 3 was one obtained by demonomerizing the raw material 2 pellets in a vacuum oven under conditions of 150° C. and 10 mmHg for 15 hours to adjust the lactide content. The raw material 4, after being subjected to the polymerization reaction until an equilibrium state was achieved, was pelletized in the same manner as the raw material 1. The raw material 5 was one having an adjusted lactide content by performing demonomerization using the raw material 4 pellets in a vacuum oven under conditions of 140° C. and 10 mmHg for 15 hours. The raw material 6 was produced from raw material pellets obtained by the following method. In a container equipped with a stirrer, 200 parts by mass of acetone and 100 parts by mass of the raw material 2 pellets were placed, and subjected to wash treatment at a stirring revolution number of 10 rpm and 40° C. for six hours. The washed pellets were separated from the acetone using a container having a fixed stainless screen whose opening is 0.5 mm. After the wash treatment was repeated three times, the washed pellets were left in a vacuum oven under conditions of 80° C. and 5 mmHg for 20 hours to remove the acetone remaining on the pellets. The raw material 1 to the raw material 6 were dried in a vacuum oven at 100° C. for three hours and stored in a dessicator in which silica gel was placed. It should be noted that the raw material 2 and the raw material 4 were treated under reduced pressure to obtain the raw material 3 and the raw material 5 respectively and that only their lactide contents varied and their YI showed no change.

Examples 1 to 11

A 10 mL brown glass ampoule having a thickness of 0.45 mm and a light transmittance of not than 45% at a wavelength of 450 nm was filled with 3 parts by mass of each poly L-lactic acid obtained in Manufacture Examples, maintained at 10 mmHg for 15 minutes, and subsequently, the gas shown in Table 2 was used to release the depressurization. After the depressurization and release of the depressurization with the gas were repeated four times, the tip of the ampoule was melt-sealed using a gas burner to establish a hermetic state, and subsequently, heat treatment was performed at the temperature for the treatment time shown in Table 2. After the heat treatment, followed by cooling to room temperature, the pellets were removed, and the weight average molecular weight Mw, yellow index YI, and quantitative analysis of lactide and Sn were determined. The results are shown in Table 3. It should be noted that Examples 1 to 5 in the table show the influence of the heat treatment temperature, Examples 6 to 8 show the influence of the dew point temperature of the dry air, Example 9 shows the influence of the lactide content, and Example 10 and Example 11 show an influence of the molecular weight.

Examples 12 and 13

The heat stability test was performed, and the test conditions and results are shown in Table 4.

It should be noted that dry air having a dew point temperature of −5° C. among "dry airs" used was air compressed using a compressor, and dry air having a dew point temperature of −50° C. or −70° C. used was commercially-available air enclosed in a cylinder.

Comparative Examples 1 to 5

Each of the poly L-lactic acids obtained in Manufacture Examples was subjected to decompression and gas purge in a brown ampoule in the same manner as in Examples 1 to 10, followed by being subjected to heat treatment under the conditions shown in Table 2, and the weight average molecular weight Mw, the yellow index YI, and quantitative analysis of lactide and Sn were determined. The results are shown in Table 3. In Comparative Example 1, dry nitrogen substantially containing no oxygen (nitrogen content: 99.6% by volume, oxygen content: 0.4% by volume) was used, and in Comparative Example 2 used, air (an atmosphere) having a higher dew point temperature was used instead of the dry air. In Comparative Example 3, the heat treatment was performed below the melting point of the monomer, and in Comparative Example 4, the heat treatment was performed at a temperature above the melting point of the polymer. In Comparative Example 5, the heat treatment was performed on poly L-lactic acid containing substantially no monomer.

Comparative Examples 6 and 7

The heat stability test was performed, and the test conditions and the results are shown in Table 4.

According to Table 3, the heat treatment was performed at or above 100° C. or the heat treatment was performed under a dry air atmosphere to thereby clearly reduce the yellow index (YI) and reduce the yellowish coloring of the lactic acid-based polymer. Additionally, the molecular weight slightly decreased within a range in which there was no practical problem, depending on the atmospheric pressure dew point temperature of the moisture in the dry air.

Alternatively, the amount of the residual lactide was clearly reduced in the sample after the heat treatment. Also, the greater the amount of the residual lactide in the polymer, the higher the decoloring effect. Additionally, the amount of residual catalyst was reduced. Subsequently, in the heat stability test, as seen from Table 4, those subjected to decoloring treatment have low and suppressed coloring, a smaller decrease in the molecular weight in heating, and improved heat stability.

As described above, the purification methods according to Examples were able to further reduce the coloring of the aliphatic polyester, to further reduce the amount of residual monomer and residual catalyst, and to improve the stability and appearance compared to those of Comparative Examples. The purification methods according to Examples can sufficiently reduce the coloring of the lactic acid-based polymers by a simple method as aforementioned without necessity of special equipment. Simultaneously, the amount of residual monomer and residual catalyst can also be reduced and the stability of the lactic acid-based polymer can be improved. Additionally, this purification method is a very efficient and effective method, because the method is simple and can be performed in parallel with removal of water by pre-drying, which is essential for molding a lactic acid-based polymer. Additionally, the method is a very effective and revolutionary method because the cost and efforts can be reduced in that a lactic acid-based polymer having a good appearance and improved stability can be obtained by utilizing the perspiration action of the residual monomer, in medical applications in which containment of these impurities is not desired, without washing in a solvent and the like.

TABLE 1

| No. | Initiator amount [g] | Monomer melting point [° C.] | Polymer melting point [° C.] | Mw | YI | Lactide content [wt %] | Sn content [ppm] |
| --- | --- | --- | --- | --- | --- | --- | --- |
| Raw material 1 | 6.2 | 97.6 | 178.2 | 226000 | 2.80 | 11.25 | 12.8 |
| Raw material 2 | 4.9 | 97.7 | 178.6 | 252000 | 2.27 | 9.60 | 12.6 |
| Raw material 3 | Same as Raw material 2 | Same as Raw material 2 | 178.4 | 250000 | 2.88 | 0.18 | 12.9 |
| Raw material 4 | 11.8 | 97.8 | 176.8 | 132000 | 1.85 | 3.20 | 12.4 |
| Raw material 5 | Same as Raw material 4 | Same as Raw material 4 | 176.1 | 117000 | 1.89 | 0.21 | 12.3 |
| Raw material 6 | Same as Raw material 2 | Same as Raw material 2 | 179.3 | 251000 | 2.02 | 0.028 | 12.9 |

TABLE 2

| No. | Raw material used | Decoloring temperature [° C.] | Decoloring time [h] | Gas type | Atmospheric pressure dew point temperature of moisture [° C.] |
| --- | --- | --- | --- | --- | --- |
| Example 1 | Raw material 1 | 117 | 23 | Dry air | −70 |
| Example 2 | Raw material 1 | 120 | 12 | Dry air | −70 |

TABLE 2-continued

| No. | Raw material used | Decoloring temperature [° C.] | Decoloring time [h] | Gas type | Atmospheric pressure dew point temperature of moisture [° C.] |
|---|---|---|---|---|---|
| Example 3 | Raw material 1 | 125 | 6 | Dry air | −70 |
| Example 4 | Raw material 1 | 130 | 6 | Dry air | −70 |
| Example 5 | Raw material 1 | 140 | 6 | Dry air | −70 |
| Example 6 | Raw material 2 | 130 | 6 | Dry air | −70 |
| Example 7 | Raw material 2 | 130 | 6 | Dry air | −50 |
| Example 8 | Raw material 2 | 130 | 6 | Dry air | −5 |
| Example 9 | Raw material 3 | 130 | 6 | Dry air | −5 |
| Example 10 | Raw material 4 | 125 | 6 | Dry air | −50 |
| Example 11 | Raw material 5 | 125 | 6 | Dry air | −50 |
| Comparative Example 1 | Raw material 2 | 130 | 6 | Dry nitrogen | −70 |
| Comparative Example 2 | Raw material 2 | 130 | 6 | Air | 7 |
| Comparative Example 3 | Raw material 1 | 90 | 12 | Dry air | −70 |
| Comparative Example 4 | Raw material 1 | 185 | 6 | Dry air | −70 |
| Comparative Example 5 | Raw material 6 | 130 | 6 | Dry air | −70 |

TABLE 3

| No. | Mw | YI | Lactide content [wt %] | Sn content [ppm] | Mw retention rate [%] | YI reduction rate [%] | Lactide content reduction rate [%] | Sn content reduction rate [%] |
|---|---|---|---|---|---|---|---|---|
| Example 1 | 198000 | 0.96 | 8.60 | 10.5 | 87.6 | 65.7 | 23.6 | 18.0 |
| Example 2 | 205000 | 0.91 | 8.80 | 10.4 | 90.7 | 67.5 | 21.8 | 18.8 |
| Example 3 | 203000 | 0.95 | 9.20 | 10.8 | 89.8 | 66.1 | 18.2 | 15.6 |
| Example 4 | 203000 | 0.80 | 8.90 | 10.6 | 89.8 | 71.4 | 20.9 | 17.2 |
| Example 5 | 197000 | 0.96 | 7.80 | 9.8 | 87.2 | 65.7 | 30.7 | 23.4 |
| Example 6 | 231000 | 0.93 | 7.60 | 10.5 | 91.7 | 59.0 | 20.8 | 16.7 |
| Example 7 | 231000 | 0.83 | 7.42 | 10.3 | 91.7 | 63.4 | 22.7 | 18.3 |
| Example 8 | 223000 | 0.91 | 7.49 | 10.4 | 88.5 | 59.9 | 22.0 | 17.5 |
| Example 9 | 229000 | 2.24 | 0.10 | 10.1 | 91.6 | 22.2 | 44.4 | 21.7 |
| Example 10 | 129000 | 0.70 | 2.40 | 9.7 | 97.7 | 62.2 | 25.0 | 21.8 |
| Example 11 | 112000 | 1.59 | 0.11 | 10.2 | 95.7 | 15.9 | 47.6 | 17.1 |
| Comparative Example 1 | 239000 | 2.23 | 9.40 | 12.4 | 94.8 | 1.8 | 16.4 | 1.6 |
| Comparative Example 2 | 183000 | 0.61 | 6.20 | 9.6 | 72.6 | 73.1 | 35.4 | 22.0 |
| Comparative Example 3 | 225000 | 2.78 | 11.12 | 12.9 | 99.6 | 0.72 | 1.2 | 0.0 |
| Comparative Example 4 | 113000 | 4.89 | 8.26 | 13.1 | 50.4 | −74.6 | 26.6 | −2.3 |
| Comparative Example 5 | 233000 | 1.88 | 0.030 | 12.9 | 92.8 | 6.9 | −7.1 | 0.0 |

TABLE 4

| No. | Test raw material | Heating temperature [° C.] | Heating time [h] | Mw before heating | Mw after heating | Mw retention rate [%] | YI |
|---|---|---|---|---|---|---|---|
| Example 12 | Raw material obtained by heating the decolored product obtained in Example 1 and removing lactide therefrom | 220 | 1 | 191000 | 143000 | 75.1 | 1.57 |
|  |  | 220 | 3 | 191000 | 118000 | 61.9 | 1.69 |
| Example 13 | Raw material obtained by heating the decolored product obtained in Example 5 and removing lactide therefrom | 220 | 1 | 186000 | 135222 | 72.7 | 1.54 |
|  |  | 220 | 3 | 186000 | 114762 | 61.7 | 1.65 |

TABLE 4-continued

| No. | Test raw material | Heating temperature [° C.] | Heating time [h] | Mw before heating | Mw after heating | Mw retention rate [%] | YI |
|---|---|---|---|---|---|---|---|
| Comparative Example 6 | Raw material obtained by heating the decolored product obtained in Comparative Example 1 and removing lactide therefrom | 220<br>220 | 1<br>3 | 222000<br>222000 | 154068<br>119658 | 69.4<br>53.9 | 2.42<br>2.64 |
| Comparative Example 7 | Raw material 6 | 220<br>220 | 1<br>3 | 250000<br>250000 | 168000<br>135250 | 67.2<br>54.1 | 2.42<br>2.64 |

The invention claimed is:

1. A method of purifying a lactic acid-based polymer, comprising
   (a) obtaining an aliphatic polyester by
      i. polymerizing a monomer in the presence of a catalyst, allowing the polymerization reaction to reach an equilibrium state between the monomer and the lactic acid-based polymer, and adding the monomer to the reaction product such that the content of the monomer reaches not more than 30% by mass to the polymerized product obtained by the polymerization reaction; or
      ii. polymerizing a monomer in the presence of a catalyst, stopping the polymerization reaction before the conversion rate of the monomer reaches an equilibrium state such that the conversion rate from the monomer to the polymer reaches not less than 70% in the polymerization reaction;
subjecting the lactic acid-based polymer of step (a) to heat treatment under oxygen-containing dry gas at a temperature at or above the melting point of the monomer and at or below the melting point of the aliphatic polyester,
   wherein the oxygen-containing dry gas has an atmospheric pressure dew point temperature of −5° C. or below,
   wherein a YI reduction rate of before and after the heat treatment is not less than 15.9%, and
   wherein the oxygen-containing dry gas contain not less than 1% by volume of oxygen relative to the total amount of gas.

2. A lactic acid-based polymer purified by the method for purifying a lactic acid-based polymer according to claim 1.

3. The method of claim 1, wherein the lactic acid-based polymer is a lactic acid-based polyester.

4. The method of claim 2, wherein the catalyst is tin octylate.

5. The method of claim 4, wherein the reaction is stopped by addition of sodium polyphosphate as the catalyst quencher.

* * * * *